United States Patent Office 3,507,881
Patented Apr. 21, 1970

3,507,881
SPIRO-TETRALINE SUCCINIMIDE COMPOUNDS
Rune Verner Sandberg, Jarna, Sweden, assignor to Aktiebolaget Astra, Sodertalje, Sweden, a Swedish company
No Drawing. Filed Sept. 7, 1966, Ser. No. 577,601
Claims priority, application Sweden, Sept. 17, 1965, 12,164/65
Int. Cl. C07d 27/10
U.S. Cl. 260—326.5  12 Claims

ABSTRACT OF THE DISCLOSURE

Spiro-tetraline succinimide compounds containing besides the succinimide group, which may be substituted, a bivalent saturated hydrocarbon radical attached to the nitrogen of the amide group, and attached to said hydrocarbon radical any of certain amino groups. The application also discloses the use of such compounds in pharmaceutical preparation, specifically local anesthetics.

---

The present invention relates to N-alkyl amino-alkyl derivatives of spiro-tetraline succinimides (STS) and their salts and also to a process for their preparation.

More particularly the present invention relates to compounds of the formula:

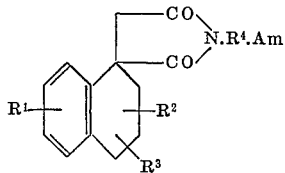

(I)

wherein $R^1$ is selected from the group consisting of hydrogen halogen, lower alkyl, hydroxy and lower alkoxy; $R^2$ and $R^3$ are selected from the group consisting of hydrogen, lower alkyl, hydroxy and lower alkoxy; $R^4$ is a bivalent saturated hydrocarbon radical containing at most 6 carbon atoms and Am is an amino group selected from the class consisting of pyrrolidino, piperidino, morpholino and

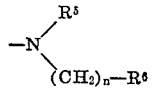

wherein $R^5$ is a hydrogen atom or a lower alkyl group, $R^6$ is a hydrogen atom, a hydroxy or lower alkoxy group and $n$ is 1–4 in cases when $R^6$ is a hydrogen atom or 2, 3 or 4 in cases when $R^6$ is a hydroxy or lower alkoxy group; and a process for their preparation.

An object of the present invention is to discover the formation of alkyl aminoalkyl derivatives of STS and salts thereof. These new derivatives are stable and possess valuable pharmacological properties, especially as local anesthetics.

Another object of the present invention is to provide a method for preparing alkyl aminoalkyl derivatives of STS suitable for manufacturing and for administering to humans and animals.

The preparation of the compounds according to the invention is described by the general reaction:

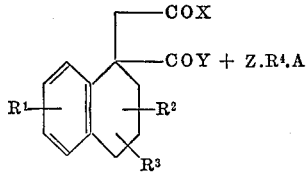

(II)

wherein $R^1$, $R^2$, $R^3$, and $R^4$ have the meaning described above and A is an amino group selected from the class consisting of pyrrolidino, piperidino, morpholino and

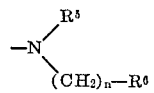

wherein $R^5$ is a hydrogen atom or an alkyl group containing not more than four carbon atoms, $R^6$ is a hydrogen atom, a hydroxy or alkoxy group containing not more than four carbon atoms, and $n$ is 1–4 in cases where $R^6$ is a hydrogen atom or 2, 3 or 4 in cases when $R^6$ is a hydroxy group or alkoxy group containing not more than four carbon atoms, which amino group may be present at the reaction or introduced later in a manner known in the art, and where X, Y and Z are members of the group consisting of hydroxy, alkoxy, halogens, amino, and —O—tosyl and which are capable of reacting in random manner with each other to form a nitrogen bridge; whereafter A, in cases when A is not equal to Am, is transformed into Am in a manner known in the art. Thus, for instance, X and Y may first react with each other with the formation of an —O—bridge (an anhydride is formed) or a —NH—bridge (a cyclic imide is formed). This will be further illustrated by the examples given below.

The preferred method for the preparation of the compounds according to the invention comprises reacting an equivalent amount of a dicarboxylic acid with an alkylene diamine in accordance with the following general scheme:

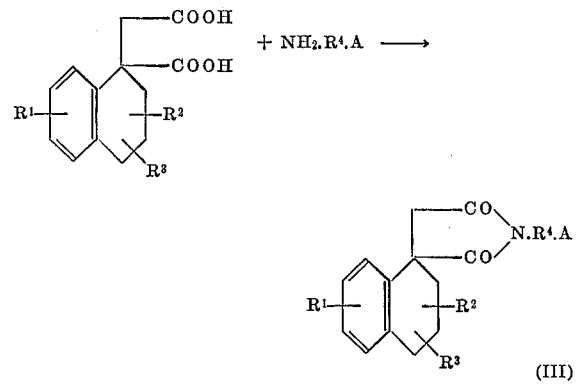

(III)

where $R^1$, $R^2$, $R^3$, $R^4$ and A have the meaning given above.

Other methods for the preparation of the compounds according to the invention may be represented by the following reaction schemes:

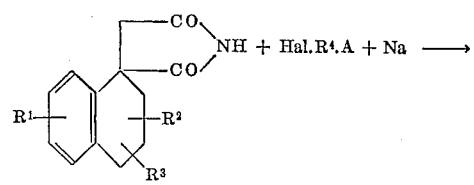

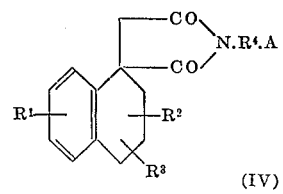

(IV)

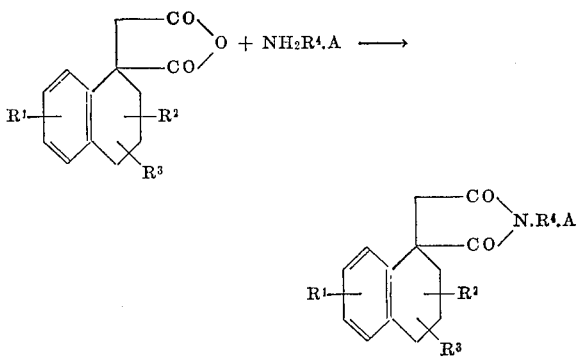

The choice among the different methods of preparation is affected by the structure of the compound to be prepared, i.e. whether a mono- or dialkylamino derivative is to be prepared.

The compounds according to the invention may occur in stereoisomeric forms or even in pairs of enantiomorphs. This is due to the presence of one or more asymmetric carbon atoms in the molecule. The present invention comprises the optically pure forms as well as mixtures of them.

It has now been found that the compounds comprising the present invention possess valuable pharmacological properties, especially as local anesthetics. As such, some of the compounds may be used as topical anesthetics, while others may favorably be used as infiltration anesthetics with an often long-lasting effect.

These advantages are obtained by the use of one or more compounds selected from the group consisting of alkylaminoalkyl derivatives of STS and pharmaceutically acceptable salts thereof. The expression "pharmaceutically acceptable salts" is recognized in the art to designate an acid addition salt which is physiologically unharmful when administered in a dosage and at an interval (i.e., frequency of administration) that is effective for the indicated therapeutic use of the parent compound.

Typical therapeutically acceptable addition salts of the present invention include, but are not limited to, the salts of mineral acids, such as hydrochloric, hydrobromic, phosphoric or sulphuric acid, organic acids, such as acetic, glycolic, lactic, levulinic, citric, fumaric, maleic, succinic, tartaric, benzoic, and cinnamic acids, as well as sulphonic acids, such as methanesulphonic and sulphamic acid.

In therapy the compounds of the present invention are administered in the form of a solution in a pharmaceutical carrier. The concentration is not important. Widely varying concentrations are therapeutically effective. Typically, solutions may contain from approximately 0.02% up to approximately 10% by weight. The compounds of the present invention may be administered in the form of other pharmaceutical preparations, such as suspensions, jellies, ointments or bases. In these preparations the compounds may be used in the form of free bases or as addition salts or as both.

As is well known in the art, solutions of local anesthetics may be made isotonic by the addition of compounds, such as sodium chloride. Furthermore, as is known in the art of local anesthesia, the effectiveness of the anesthesia may be improved by addition of a vasoconstrictor, such as adrenaline, noradrenaline or octapressin.

The amount of local anesthetic which may be used varies widely, and as is well known, depends upon the location and type of anesthesia required. The anesthetic effect, according to the present invention, is induced by applying an amount of a solution of the spiro-tetraline succinimide derivative, which is effective in producing the desired anesthesia.

Repeated applications at therapeutically effective intervals may be made, if desired, to obtain a prolonged anesthetic effect.

The following examples illustrate, but in no way limit, the application of the present invention.

EXAMPLE 1

Preparation of 1-carboxy-1-[1,2,3,4-tetrahydronaphtyl]-acetic acids

The preparation of the 1-carboxy-1-[1,2,3,4-tetrahydronaphthyl] acetic acids, which were used as starting materials was made in accordance with the following reaction scheme

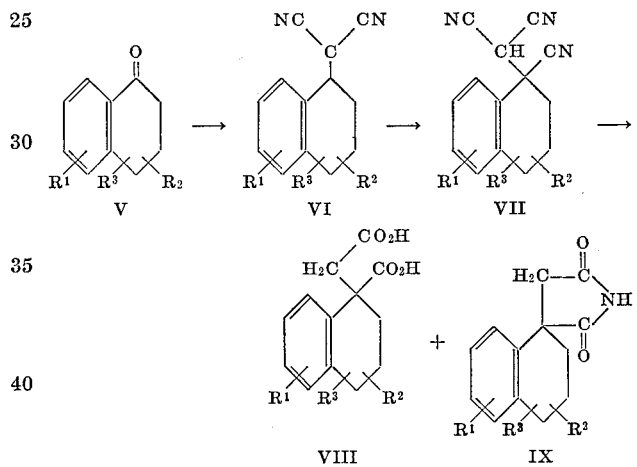

The individual steps are described below:

1-Tetrahydronaphthylidenemalononitriles (VI)

The Knoevenagel condensation of the tetralones V with malononitrile was effected according to Mowry (J. Am. Chem. Soc. 67, (1945) 1050). In Table 1 the yields, melting points, and analyses of the malononitriles prepared are given.

TABLE 1.—1-TETRAHYDRONAPHTHYLINDENEMALONONITRILES (VI)

| | | | | | Analyses, percent | | | | | |
|---|---|---|---|---|---|---|---|---|---|---|
| | | | | | Calculated | | | Found | | |
| $R^1$ | $R^2$ and $R^3$ | Yield, percent | M.P., °C. | Formula | C | H | N | C | H | N |
| 7-$CH_3$ | H | 60 | 88–90 | $C_{14}H_{12}N_2$ | 80.74 | 5.81 | 13.45 | 80.6 | 5.82 | 13.6 |
| 7-Cl | H | 55 | 110–112 | $C_{13}H_9N_2Cl$ | 68.28 | 3.97 | 12.25 | 68.2 | 4.00 | 12.2 |
| 6-$CH_3O$ | H | 80 | 117–119 | $C_{14}H_{12}N_2O$ | | | 12.49 | | | 12.5 |
| H | 4,4-di$CH_3$ | 60 | 120–121 | $C_{15}H_{14}N_2$ | 81.05 | 6.35 | 12.61 | 81.0 | 6.22 | 12.7 |
| 7-$CH_3O$ | H | 83 | 97.5–99.5 | $C_{14}H_{12}N_2O$ | 74.99 | 5.38 | 12.49 | 75.0 | 5.57 | 12.4 |
| 7-F [1] | H | 75 | 77.5–78.5 | $C_{13}H_9FN_2$ | 73.75 | 4.27 | 13.20 | 73.1 | 4.51 | 13.2 |

[1] The starting material, 7-fluorotetralone, was prepared from 7-aminotetralone in a way similar to that used for 6-fluorotetralone by Allinger et al. (J. Org. Chem. 27 (1962, 72). M.P. 62.5–64° C. Calc. (percent): C, 73.16; H, 5.52. Found (percent): C, 73.3; H, 5.43.

1-cyano-1-tetrahydronaphthylmalononitriles (VII)

The two solutions obtained by dissolving 0.1 mole of VI in 50 ml. of dry ethanol and 0.2 mole (9.8 g.) of sodium cyanide in 50 ml. of water respectively, were rapidly mixed and the mixture shaken vigorously. Within a few minutes a homogenous solution was obtained, which was heated on the water bath for four minutes. While stirring and cooling externally 200 ml. of ice-water followed by 25 ml. of concentrated hydrochloric acid were added. The precipitated product soon crystallizes.

TABLE 2.—1-CYANO-1-TETRAHYDRONAPHTHYLMALONONITRILES VII

| | | | | | Analyses, percent | | | | | |
|---|---|---|---|---|---|---|---|---|---|---|
| | | | | | Calculated | | | Found | | |
| $R^1$ | $R^2$ and $R^3$ | Yield, percent | M.P., °C. | Formula | C | H | N | C | H | N |
| 7-$CH_3$ | H | 64 | 89–91 | $C_{15}H_{13}N_3$ | 76.57 | 5.57 | 17.86 | 76.3 | 5.38 | 18.1 |
| 7-Cl | H | 99 | 142–145 | $C_{14}H_{10}N_3Cl$ | 65.76 | 3.94 | 16.43 | 65.8 | 4.07 | 16.2 |
| 6-$CH_3O$ | H | | 152–154 | $C_{15}H_{13}N_3O$ | | | 16.75 | | | 16.7 |
| H | 4,4-di$CH_3$ | 99 | 104–106 | $C_{16}H_{15}N_3$ | 77.08 | 6.07 | 16.85 | 77.0 | 6.15 | 17.2 |
| 7-$CH_3O$ | H | 93 | 133–136 | $C_{15}H_{13}N_3O$ | 71.69 | 5.21 | 16.72 | 71.7 | 5.25 | 16.9 |
| 7-F | H | 96 | 118–121 | $C_{14}H_{10}FN_2$ | 7.28 | 4.21 | 17.56 | 70.2 | 4.21 | 17.6 |

1-carboxy-1-tetrahydronaphthylacetic acids (VIII) and spiro succinimides (IX)

The nitriles VII were hydrolyzed with decarboxylation by refluxing for 40 hours in a 1:1 mixture of conc. hydrochloric acid and acetic acid (1000 ml./mole). The solvent was evaporated and the residue treated with dilute ammonia. Undissolved imide (IX) was filtered by suction, dried and recrystallized. The alkaline filtrate was acidified, and the precipitated succinic acid derivative (VIII) was filtered off and recrystallized from water, occasionally with some formic acid added. The acid and the imide were generally obtained in the ratio 3:1.

The hydrolysis of 7-methoxy-1-cyano-1-tetrahydronaphthylmalononitrile yields only the demethylated acid, 7-hydroxy-1-carboxy-1-tetrahydronaphthyl-acetic acid.

The 7-methoxy acid was prepared by methylating the 7-hydroxy acid with dimethylsulphate in aqueous alkaline solution for 1 hour (reflux). The acid was recrystallized from water.

7-i-propoxy-1-carboxy-1-tetrahydronaphthylacetic acid was prepared from the 7-hydroxy acid (1 mole) by means of sodium ethoxide (3 moles) and isopropylbromide (3 moles) in ethanolic solution. Reaction time (reflux) 8 hours. The acid was recrystallized from water-formic acid.

TABLE 3.—1-CARBOXY-1-TETRAHYDRONAPHTYLACETIC ACIDS (VIII)

| | | | | | Analyses, percent | | | | | |
|---|---|---|---|---|---|---|---|---|---|---|
| | | | | | Calculated | | | Found | | |
| $R^1$ | $R^2$ and $R^3$ | Yield, percent | M.P., °C. | Formula | C | H | O | C | H | O |
| H | H | 81[1] | 175–7 | $C_{13}H_{14}O_4$ | 66.65 | 6.02 | 27.32 | 66.4 | 5.99 | 27.4 |
| 7-$CH_3$ | H | 70[1] | 185–9 | $C_{14}H_{16}O_4$ | 67.73 | 6.50 | 25.78 | 67.3 | 6.56 | 25.6 |
| 7-Cl | H | 68[1] | 193–6 | $C_{13}H_{13}O_4Cl$ | 58.11 | 4.88 | 23.82 | 58.6 | 4.88 | 23.9 |
| 6-$CH_3O$ | H | 32.5[2] | 163.5–5.5 | $C_{14}H_{16}O_5$ | 63.62 | 6.10 | 30.27 | 63.3 | 5.86 | 30.6 |
| H | 4,4-di$CH_3$ | 62[1] | 151–3 | $C_{15}H_{18}O_4$ | 68.69 | 6092 | 24.40 | 68.4 | 7.09 | 24.4 |
| 7-HO | H | 56[3] | 195–9 | $C_{13}H_{14}O_5$ | 62.39 | 5.65 | 31.97 | 62.5 | 5.78 | 31.7 |
| 7-$CH_3O$ | H | 85[4] | 163–5 | $C_{14}H_{16}O_5$ | 63.62 | 6.10 | 30.27 | 63.4 | 5.90 | 30.3 |
| 7-i-Pr-O | H | 58[4] | 169.5–171.5 | $C_{16}H_{20}O_5$ | 65.74 | 6.90 | 27.37 | 65.6 | 7.15 | 27.6 |
| 7-F | H | 60[1] | 176–7.5 | $C_{13}H_{13}FO_4$ | [5]252.2 | | | [5]253 | | |

[1] Including hydrolyzed imide.
[2] Calculated on VI.
[3] From 7-methoxy-1-cyano-1-tetrahdronaphtylmalononitrile.
[4] From the phenolic acid.
[5] Equivalent weight.

TABLE 4.—Tetrahydronaphthaline-1-spiro-tetraline succinimides (IX)

| | | | | Analyses, percent | | | | | |
|---|---|---|---|---|---|---|---|---|---|
| | | | | Calculated | | | Found | | |
| $R^1$ | $R^2$ and $R^3$ | M.P., °C. | Formula | C | H | N | C | H | N |
| H | H | 155–7 | $C_{13}H_{13}NO_2$ | 72.54 | 6.09 | 6.51 | 72.5 | 5.93 | 6.52 |
| 7-$CH_3$ | H | 142–4 | $C_{14}H_{15}NO_2$ | 73.34 | 6.59 | 6.11 | 73.4 | 6.50 | 6.08 |
| 7-Cl | H | 218–20 | $C_{13}H_{12}NO_2Cl$ | 62.53 | 4.85 | 5.61 | 62.2 | 4.80 | 5.53 |
| 6-$CH_3O$ | H | 163.5–5 | $C_{14}H_{15}NO_3$ | 68.55 | 6.16 | 5.71 | 68.4 | 6.11 | 5.67 |
| H | 4,4-di$CH_3$ | 174.5–7 | $C_{15}H_{17}NO_2$ | 74.05 | 7.04 | 5.76 | 73.6 | 6.86 | 5.82 |

EXAMPLE 2

N-(γ-diethylaminopropyl)-STS

Equimolecular amounts of the anhydride of compound VIII prepared from VIII ($R^1=R^2=R^3=H$) by refluxing for 1 hour in tetrachloroethane under a water separator, M.P. 96–98° C., and diethylaminopropylamine were mixed and heated for 1 hour at 160° C. After cooling, the product was dissolved in dilute hydrochloric acid. The solution was washed with ether and then the solution was made alkaline by the addition of dilute sodium hydroxide solution. The precipitated base was taken up in ether, dried and converted to its hydrochloride. M.P. 175–7° C. (from dioxane). Yield 62%.

*Analysis.*—Calcd. (percent): N, 7.68; Cl. 9.72. Found (percent): N, 7.7; Cl, 9.70.

EXAMPLE 3

N-(α-ethyl-β-dimethylaminoethyl)-STS (A) By replacing the amine in the preceding example with 2-amino-1-dimethylaminobutane (1.15 g.), there is obtained 2.5 g. of crude hydrochloride. This was recrystallized from methanol (twice) yielding 1.5 g. with M.P. 250–4° C.

*Analysis.*—Calcd. (percent): N, 7.98; Cl, 10.11. Found (percent): N, 7.9; Cl, 10.1.

(B) The mother liquor from the first recrystallization was evaporated to dryness and the residue was recrystallized from methanol-ethylacetate yielding 1.2 g. of M.P. 218–20° C.

*Analysis.*—Calcd. (percent): N, 7.98; Cl, 10.11. Found (percent): N, 7.9; Cl, 10.2.

EXAMPLE 4

N-(γ-ethylhydroxyethylaminopropyl)-STS

Prepared by replacing the amine in Example 2 with 3-ethylhydroxyethylaminopropylamine and distilling the product, B.P. 185° C./0.005 mm. Hg.

*Analysis.*—Calcd. (percent): N, 8.13; O, 13.9. Found (percent): N, 8.24; O, 14.1.

EXAMPLE 5

N-(γ-methylmethoxyethylaminopropyl)-STS

Prepared by replacing the amine in Example 4 with γ-methylmethoxyethylaminopropylamine. B.P. 135° C./ 0.005 mm. Hg.

*Analysis.*—Calcd.: N, 8.13%; eq. w., 344.5. Found: N, 7.9%; eq. w., 344.

EXAMPLE 6

N-(ε-dimethylaminobutyl)-4,4-dimethyl-STS

Prepared from 1-carboxy-4,4-dimethyl-tetrahydronaphthylacetic acid and 4-dimethylaminobutylamine in the same way as in Examples 2 and 3. Yield 59% of hydrochloride with M.P. 180.5–3.5° C.

Analysis.—Calcd. (percent): N, 7.39; Cl, 9.36. Found (percent): N, 7.4; Cl, 9.4.

EXAMPLE 7

N-(γ-diethylaminopropyl)-7-methyl-STS

Prepared from 1-carboxy-7-methyl-tetrahydronaphthylacetic acid and 3-methylethylaminopropylamine yield 60% with B.P. 175–80° C./0.05 mm. Hg.

Analysis.—Calcd.: N, 8.18%; eq. w., 342.5. Found: N, 8.2%; eq. w., 343.

EXAMPLE 8

N-(γ-dimethylaminopropyl)-6-methoxy-STS

Prepared from 1-carboxy-6-methoxy-tetrahydronaphthylacetic acid and 3-dimethylaminopropylamine by heating at 180° C. for 2 hours. Hydrochloride M.P. 158–60° C.

Analysis.—Calcd. (percent): N, 7.63; Cl, 9.66. Found (percent): N, 7.5; Cl, 9.4.

EXAMPLE 9

N-(β-methylaminoethyl)-7-Cl-STS

Prepared from 1-carboxy-7-chloro-tetrahydronaphthylacetic acid and methyl-aminoethylamine by heating at 180° C. for 1 hour. Hydrochloride M.P. 261–4° C.

Analysis.—Calcd. (percent): N, 8.16; Cl, 20.66. Found (percent): N, 7.8; Cl, 20.9.

EXAMPLE 10

N-(γ-diethylaminopropyl)-7-hydroxy-STS

Prepared from 1-carboxy-7-hydroxy-1-tetrahydronaphthylacetic acid and 3-diethylaminopropylamine by heating at 180° C. for 2 hours. Hydrochloride M.P. 190–192.5° C.

Analysis.—Calcd. (percent): N, 7.36; Cl, 9.32. Found (percent): N, 7.27; Cl, 9.29.

EXAMPLE 11

N-(γ-diethylaminobutyl)-7-methoxy-STS

Prepared from 1-carboxy-7-methoxy-1-tetrahydronaphthylacetic acid and 4-diethylaminobutylamine by heating at 180° C. for 2 hours. M.P. 51–53.5° C.

Analysis.—Calcd. (percent): N, 7.52; O, 12.9. Found (percent): N, 7.60; O, 13.3.

EXAMPLE 12

N-(γ-dimethylaminopropyl)-7-isopropoxy-STS

Prepared from 1-carboxy-7-isopropoxy-1-tetrahydronaphthylacetic acid and dimethylaminopropylamine by heating at 170° C. for 2 hours. Hydrochloride M.P. 162–164° C.

Analysis.—Calcd. (percent): N, 7.09; Cl, 8.98. Found (percent): N, 7.03; Cl, 8.94.

EXAMPLES 13–54 AND 73

The compounds of Formula I in Table 5 (in which $R^1$, $R^2$, $R^3$, $R^4$ and Am have the specified significance) were obtained in a manner analogous to that described in Examples 6–12.

TABLE 5.—SPIRO-TETRALINE SUCCINIMIDES (I)

| No. | $R^1$ | $R^2$ and $R^3$ | $R^4$ | Am | M.P. of hydrochloride or B.P. of free base | Calculated N | Calculated Cl | Found N | Found Cl |
|---|---|---|---|---|---|---|---|---|---|
| 13 | H | H | —CH$_2$CH$_2$— | —N(CH$_3$)$_2$ | 196–8° C. | 8.68 | 10.98 | 8.7 | 10.9 |
| 14 | H | H | —CH$_2$—CH(CH$_3$)— | —N(CH$_3$)$_2$ | 204–6° C. | 8.32 | 10.53 | 8.4 | 10.6 |
| 15 | H | H | —CH(CH$_3$)—CH$_2$— | —N(CH$_3$)$_2$ | 246–9° C. (d) | 8.32 | 10.52 | 8.3 | 10.6 |
| 16 | H | H | —CH$_2$—CH(C$_2$H$_5$)— | —N(CH$_3$)$_2$ | | 7.98 | 10.11 | 7.8 | 10.0 |
| 17 | H | H | | ⟨N—CH$_3$⟩ | 250–60° C. | 8.03 | 10.16 | 7.9 | 10.3 |
| 18 | H | H | —CH$_2$—CH$_2$— | —N⟨O⟩ | 125–7.5° C. (base) | 8.53 | ¹328.4 | 8.6 | ¹326 |
| 19A | H | H | —CH$_2$—CH(CH$_3$)— | —N(C$_2$H$_5$)$_2$ | 177–80° C. | 7.68 | 9.72 | 7.6 | 9.7 |
| 19B | H | H | —CH$_2$—CH(CH$_3$)— | —N(C$_2$H$_5$)$_2$ | 223–5.5° C. | 7.68 | 9.72 | 7.6 | 9.8 |
| 20 | H | H | —CH(CH$_3$)—CH$_2$— | —N(C$_2$H$_5$)$_2$ | 180–6° C. | 7.68 | 9.72 | 7.7 | 9.6 |
| 21A | H | H | —CH$_2$—CH(C$_2$H$_5$)— | —N(C$_2$H$_5$)$_2$ | 200–3° C. | 7.39 | 9.37 | 7.3 | 9.4 |
| 21B | H | H | —CH$_2$—CH(C$_2$H$_5$)— | —N(C$_2$H$_5$)$_2$ | 161.5–5° C. | 7.39 | 9.37 | 7.3 | 9.4 |
| 22 | H | H | —CH(C$_2$H$_5$)—CH$_2$— | —N(C$_2$H$_5$)$_2$ | 164–5° C. | 7.39 | 9.37 | 7.3 | 9.5 |
| 23 | H | H | —CH$_2$—CH$_2$—CH$_2$— | —N(CH$_3$)$_2$ | 144–6° C. | 8.32 | 10.53 | 8.1 | 10.5 |
| 24A | H | H | —CH$_2$—CH$_2$—CH(CH$_3$)— | —N(CH$_3$)$_2$ | 191–3° C. | 7.98 | 10.11 | 7.8 | 9.8 |

TABLE 5.—SPIRO-TETRALINE SUCCINIMIDES (I).—Continued

| No. | R¹ | R² and R³ | R⁴ | Am | M.P. of hydrochloride or B.P. of free base | Calculated N | Calculated Cl | Found N | Found Cl |
|---|---|---|---|---|---|---|---|---|---|
| 24B | H | H | —CH₂—CH₂—CH(CH₃)— | —N(CH₃)₂ | 171–3° C | 7.98 | 10.11 | 7.9 | 10.0 |
| 25 | H | H | CH₂—CH₂—CH₂— | —N(CH₃)(C₂H₅) | 144.5–7.5° C | 7.98 | 10.11 | 7.7 | 10.0 |
| 26 | H | H | CH₂—CH₂—CH₂— | —N(CH₃)(n-C₃H₇) | 147–9° C | 7.68 | 9.72 | 7.8 | 10.0 |
| 27 | H | H | CH₂—CH₂—CH₂— | —N(pyrrolidine) | 178.5–80.5° C | 7.72 | 9.77 | 7.7 | 9.7 |
| 28 | H | H | CH₂—CH₂—CH₂— | —N(piperidine) | 216–8° C | 7.43 | 9.41 | 7.4 | 9.4 |
| 29 | H | H | —(CH₂)₄— | —N(CH₃)₂ | 145° C./0.02 mm. Hg | 8.91 | ¹314.4 | 8.8 | ¹315 |
| 30 | H | H | —(CH₂)₄— | —N(CH₃)(C₂H₅) | 121–4° C | 7.68 | 9.72 | 7.5 | 9.7 |
| 31 | H | H | —(CH₂)₄— | —N(C₂H₅)₂ | 160° C./0.03 mm. Hg | 8.18 | ¹342.5 | 8.0 | ¹343 |
| 32 | H | H | —(CH₂)₄— | —N(pyrrolidine) | 176.5–8.5° C | 7.43 | 9.41 | 7.4 | 9.4 |
| 33 | H | H | —(CH₂)₄— | —N(piperidine) | 165–7.5° C | 7.16 | 9.09 | 6.9 | 9.1 |
| 34 | H | H | —(CH₂)₅— | —N(CH₃)₂ | 139–41° C | 7.68 | 9.72 | 7.3 | 9.7 |
| 35 | H | H | —(CH₂)₅— | —N(C₂H₅)₂ | 149–51° C | 7.14 | 9.29 | 6.9 | 9.2 |
| 36 | H | H | —(CH₂)₅— | —NH—CH₃ | 218–20° C | 9.08 | 11.48 | 9.0 | 11.5 |
| 37 | H | H | —(CH₂)₃— | —NH—C₂H₅ | 161–3.5° C | 8.30 | 10.50 | 8.3 | 10.5 |
| 38 | H | H | —(CH₂)₄— | —NH—CH₃ | 140° C./0.003 mm. Hg | 9.33 | ¹300.4 | 9.2 | ¹298 |
| 39 | H | H | —(CH₂)₄— | —NH-n-Pr | 160° C./0.005 mm. Hg | 8.53 | ¹328.5 | 8.5 | ¹330 |
| 40 | 7-Cl | H | —(CH₂)₂— | —N(CH₃)₂ | 102.5–3.5° C. (base) | 8.73 | 11.05 | 8.7 | 11.0 |
| 41 | 7-Cl | H | —(CH₂)₂— | —N(C₂H₅)₂ | 178.5–80.5° C | 7.02 | 17.76 | 7.0 | 18.1 |
| 42 | 6-CH₃O | H | —(CH₂)₂— | —N(CH₃)₂ | 176.5–8° C | 7.94 | 10.04 | 7.8 | 9.8 |
| 43 | 6-CH₃O | H | —(CH₂)₃— | —N(C₂H₅)₂ | 215–7° C | 7.09 | 8.98 | 7.0 | 8.9 |
| 44A | 6-CH₃O | H | —CH₂CH₂—CH(CH₃)— | —N(C₂H₅)₂ | 246–8° C | 6.85 | 8.67 | 6.8 | 8.6 |
| 44B | 6-CH₃O | H | —CH₂CH₂—CH(CH₃)— | —N(C₂H₅)₂ | 188–92° C | 6.85 | 8.67 | 6.9 | 8.6 |
| 45 | H | 4,4-diCH₃ | —(CH₂)₃ | —N(CH₃)(C₂H₅) | 155–7.5° C | 7.39 | 9.36 | 7.2 | 9.3 |
| 46 | H | 4,4-diCH₃ | —(CH₂)₃ | —N(C₂H₅)₂ | 140–2° C | 7.13 | 9.02 | 7.0 | 9.0 |
| 47 | 7-CH₃ | H | —(CH₂)₃ | —N(CH₃)₂ | 175–80° C./0.05 mm. Hg | 8.91 | ¹314.4 | 8.8 | ¹315 |
| 48 | 7-HO | H | —(CH₂)₄— | —N(CH₃)₂ | 174–7° C | 7.62 | 9.65 | 7.5 | 9.6 |
| 49 | 7-HO | H | —(CH₂)₄— | —N(C₂H₅)₂ | 184–6° C | 7.09 | 8.98 | 6.9 | 8.9 |
| 50 | 7-CH₃O | H | —(CH₂)₄— | —N(CH₃)₂ | 62–3.5° C. (base) | 8.13 | ¹344.5 | 8.2 | ¹340 |
| 51 | 7-i-PrO | H | —(CH₂)₃— | —N(C₂H₅)₂ | 164–6.5° C | 6.62 | 8.38 | 6.6 | 8.5 |
| 52 | H | H | —(CH₂)₂— | —N(C₂H₅)(CH₂—CH₂—OCH₃) | 133.5–137° C | 7.35 | 9.31 | 7.3 | 9.4 |
| 53 | H | H | —(CH₂)₃— | —N(C₂H₅)(CH₂—CH₂—OCH₃) | 150° C./0.005 mm. Hg | 7.81 | ¹358.5 | 7.7 | 360 |
| 54 | H | H | —(CH₂)₃— | —N(C₂H₅)(CH₂—CH₂—OC₂H₅) | 174–8° C./0.01 mm. Hg | 7.52 | ¹372.5 | 7.2 | 374 |
| 73 | 7-F | H | —(CH₂)₃— | —N(C₂H₅)₂ | 199–201.5° C | 7.32 | 9.26 | 7.25 | 9.25 |

¹ Equivalent weight.

EXAMPLE 55

N-(β-methylhydroxyethylaminoethyl)-STS 1.0 g. (50% excess) of freshly distilled ethylene oxide in 25 ml. of methanol was added dropwise to 4.2 g. of the compound prepared according to Example 36, dissolved in 30 ml. of methanol. The mixture was left at room temperature for half an hour and then heated at 40° C. for 2 hours. The solvent was evaporated and the residue worked up as described in Example 2, except for the fact that the crude base was not converted into hydrochloride but was distilled. Yield 3.5 g., boiling at 180–190° C./0.03 mm. Hg.

Analysis.—Calcd. (percent): N, 8.86; O, 15.2. Found (percent): N, 9.01; O, 15.2.

EXAMPLE 56

N-(δ-methylhydroxyethylaminobutyl)-STS

In a manner analogous to Example 55 N-(δ-methylhydroxyethylaminobutyl)-STS was prepared from ethylene oxide and the compound prepared according to Example 38. Boiling at 180–190° C./0.01 mm. Hg.

Analysis.—Calcd. (percent): N, 8.13%; eq. w., 344.5. Found (percent): N, 8.26%; eq. w., 349.6.

EXAMPLE 57

N-(γ-diethylaminopropyl)-STS

Equimolecular amounts of 1,2,3,4-tetrahydronaphthalin-1-spiro-3′-2′-5′-pyrrolidindion (IX, $R^1=R^2=R^3=H$) and diethylaminopropylamine were heated together at 200° C. for 8 hours. The resulting mixture was worked up as described in Example 2. Yielding 21% of product, M.P. 175–7° C. identical with the compound obtained in Example 2.

EXAMPLE 58

N-(β-diethylaminoethyl)-STS

To a solution of 0.46 g. (0.02 mole) of sodium in 40 ml. of methanol were added 2.14 g. (0.01 mole) of IX ($R^1=R^2=R^3=H$), followed by a solution of 1.97 g. (0.01 mole) of β-diethylaminoethylbromide hydrobromide in 15 ml. of methanol. After refluxing for 9 hours the solvent was evaporated and the residue worked up as before. Yield of hydrochloride 1.7 g. (49%) M.P. 193–5° C.

Analysis.—Calcd. (percent): N, 7.98; Cl, 10.11. Found (percent): N, 8.0; Cl, 10.0%).

EXAMPLE 59

N-(β-diethylaminoethyl)-STS

A mixture of 10 ml. of diethylaminoethylalcohol and 2.14 g. of the compound corresponding to Formula IX ($R^1=R^2=R^3=H$) were slowly heated to 180° C. and kept at this temperature for 4 hours. After heating at 220° C. for another 2 hours the product was distilled. The fraction boiling about 160° C. at 0.2 mm. Hg. was converted to hydrochloride and recrystallized from ethylacetate-methanol. Yield 1.1 g. with M.P. 192.5–5° C., not depressed in admixture with the compound prepared in Example 58.

EXAMPLE 60

N-(β-aminoethyl)-STS

To 20 ml. of ethylendiamine were added in small portions 4.3 g. of the anhydride of VIII ($R^1=R^2=R^3=H$). The mixture was then refluxed for 2 hours. Excess ethylenediamine was distilled at 10 mm. Hg. and the residue fractionated at 0.2 mm. Hg. 3 g. of the product were obtained in the range 150–170° C. This was converted to hydrochloride. Yield 1.4 g. M.P. 243–5° C. (from methanol-ethylacetate).

Analysis.—Calcd. (percent): N, 9.51; Cl, 12.03. Found (percent): N, 9.4; Cl, 11.9.

EXAMPLE 61

N-(β-n-butylaminoethyl)-STS

To a cold solution of 3.9 g. of the amine, obtained according to Example 60, in 75 ml. of ethanol, 1.3 g. of butyraldehyde were continuously added. The mixture was hydrogenated over 0.5 g. of Pt. in a Parr apparatus (4 kg./cm.$^2$). The product was isolated as hydrochloride. Yield 2.7 g., M.P. 158–60.5° C. (from ethylacetate-methanol).

Analysis.—Calcd. (percent): N, 7.98; Cl, 10.11. Found (percent): N, 7.9; Cl, 10.1.

EXAMPLE 62

N-(γ-methyl-γ-diethylaminopropyl)-STS (A) A solution of 1.4 g. (0.01 mole) of β-diethylaminobutyronitrile and 4.3 g. (0.02 mole) of the anhydride of the compound corresponding to Formula VIII ($R^1=R^2=R^3=H$) in 50 ml. of dioxane was hydrogenated over 0.5 g. of platinaoxide in a Parr apparatus at 60° C. for 12 hours. The reaction mixture was filtered and the solvent evaporated at 160° C. for 1 hour. The residue was worked up as usual. The crude hydrochloride was recrystallized repeatedly from ethylacetate - methanol yielding 0.55 g. of product M.P. 230–3° C.

Analysis.—Calcd. (percent): N, 7.39; Cl, 9.37. Found (percent): N, 7.3; Cl, 9.3.

(B) The mother liquor from the first recrystallization was evaporated to half its volume and the hydrochloride obtained recrystallized from the same solvent yielding 0.6 g. of product M.P. 184–8° C.

Analysis.—Calcd. (percent): N, 7.39; Cl, 9.37. Found (percent): N, 7.3; Cl, 9.3.

EXAMPLE 63

N-(β-n-butylamino-ethyl)-STS (A) To a solution of 0.23 g. of sodium in 20 ml. of ethanol 2.14 g. of the imide corresponding to Formula IX ($R^1=R^2=R^3=H$) were added, followed by 10 ml. of 1,2-dibromomethane. The mixture was refluxed overnight, filtered, the solvent evaporated and the residue distilled, yielding 2.5 g. of product $b_{0.01}$ 150° C.

(B) 2 g. of the bromo-compound thus obtained, were refluxed overnight with an equal amount of n-butylamine in 10 ml. of toluene. The product was isolated as hydrochloride. Yield 0.6 g., M.P. 156–9° C. (from ethylacetate-methanol), not depressed in admixture with the compound prepared according to Example 61.

EXAMPLE 64

(A) N-(γ-hydroxypropyl)-STS 12.9 g. of the anhydride of the compound corresponding to Formula VIII ($R^1=R^2=R^3=H$) and 25 ml. of 3-aminopropanol were heated at 200° C. for 2 hours. The product was fractionally distilled, yielding 12.2 g. $b_{0.01}$ 165° C.

Analysis.—Calcd. (percent): N, 5.17. Found (percent): N, 5.3.

(B) N-(γ-tosyloxypropyl)-STS

The above alcohol (12.1 g.) was tosylated in the usual manner, yielding 10.6 g. of product M.P. 106–8° C. (from ethanol).

Analysis.—Calcd. (percent): N, 3.28; S, 7.50. Found (percent): N, 3.3; S, 7.3.

(C) N-(γ-pyrrolinopropyl)-STS

A mixture of 4.25 g. (0.01 mole) of the tosyl compound and 1.5 g. (0.02 mole) of pyrroline in 35 ml. of toluene, was stirred at 45° C. for 2 hours and refluxed for another 2 hours. The precipitated salt was filtered and the filtrate washed with water and then extracted with dilute hydrochloric acid. The acid extracts were made alkaline and the precipitated base taken up in ether. After drying, the base was converted to hydorchloride. Yield 1.3 g. M.P. 162–6° C. (from ethylacetate-methanol).

*Analysis.*—Calcd. (percent): N, 7.76; Cl, 9.82. Found (percent): N, 7.7; Cl, 9.8.

EXAMPLE 65

TABLE 6.—LOCAL ANAESTHETIC ACTIVITY OF SPIRO-TETRALINE SUCCINIMIDES

| Compound according to Example No. | Rabbit cornea [1] | Isolated frog sciatic nerve block [2] | Toxicity i.v., $LD_{50}$ mg./kg. white mouse |
|---|---|---|---|
| 2 | 1.2 | 1.0 | 21 |
| 3B | 1.5 | 0.6 | 35 |
| 4 | 1.5 | 0.3 | 32 |
| 5 | 1.6 | 0.8 | 24 |
| 7 | 4.0 | 0.6 | 18 |
| 8 | 0.8 | 0.5 | 68 |
| 9 | 0.8 | 0.4 | 29 |
| 10 | 1.7 | 1 | 16 |
| 11 | 2.6 | 0.9 | 22 |
| 12 | 2.5 | 0.8 | 24 |
| 13 | 0.7 | 0.3 | 38 |
| 14 | 1.2 | 1.0 | 23 |
| 15 | 0.9 | 1.0 | 24 |
| 17 | 0.5 | 0.5 | 15 |
| 18 | 0.6 | 0.1 | 68 |
| 19A | 1.5 | 1.0 | 15 |
| 19B | 1.7 | 0.8 | 17 |
| 20 | 2.9 | 0.6 | 21 |
| 21A | 1.0 | 0.8 | 22 |
| 21B | 1.0 | 1.0 | 19 |
| 22 | 1.7 | 1.0 | 23 |
| 23 | 1.0 | 0.4 | 31 |
| 24A | 2.5 | 0.6 | 25 |
| 24B | 1.7 | 1.0 | 17 |
| 25 | 1.7 | 0.8 | 27 |
| 26 | 1.9 | 0.8 | 23 |
| 27 | 1.0 | 0.9 | 19 |
| 29 | 0.7 | 0.3 | 39 |
| 30 | 0.9 | 0.5 | 27 |
| 31 | 1.4 | 0.5 | 21 |
| 32 | 1.5 | 0.6 | 24 |
| 33 | 1.3 | 1.0 | 19 |
| 34 | 1.3 | 0.5 | 32 |
| 35 | 1.4 | 0.6 | 24 |
| 36 | 0.2 | 0.1 | 59 |
| 37 | 1.2 | 0.5 | 24 |
| 38 | 0 | 0.4 | 55 |
| 39 | 2 | 0.6 | 26 |
| 40 | 0.8 | 0.2 | 37 |
| 41 | 4.4 | 0.3 | 15 |
| 42 | 0.5 | 0.5 | 50 |
| 43 | 0.9 | 0.6 | 41 |
| 44A | 0.9 | 0.4 | 26 |
| 44B | 3.8 | 0.4 | 23 |
| 45 | 0.8 | 0.5 | 32 |
| 46 | 1.3 | 0.7 | 35 |
| 47 | 0.9 | 0.3 | 32 |
| 48 | 1 | 0.7 | 30 |
| 49 | 1.7 | 0.7 | 20 |
| 50 | 1 | 0.4 | 29 |
| 51 | 4 | 0.6 | 14 |
| 52 | 0.5 | 1 | 28 |
| 53 | 3.3 | ≥1 | 17 |
| 54 | 4 | ≥1 | 13 |
| 55 | 0.7 | 0.9 | 51 |
| 56 | 1.4 | 1 | 40 |
| 58 | 0.7 | 0.4 | 22 |
| 61 | — | 0.6 | 24 |
| 62A | 2.9 | 1.0 | 10 |
| 62B | 5.7 | 1.0 | 7.4 |
| 64 | 1.7 | 0.9 | 20 |
| 73 | 7.4 | 1 | 13 |

[1] Wiedling, S., Acta Pharmacol. et Toxicol. 8 (1952), 117.
[2] Manro, A., Truant, A.P., and McCawley, E.L., Yale J. Biol. Med. 21 (1948), 113.

Some examples are denoted A and B. This refers to those cases when the two epimers in a mixture have been separated as described in Examples 3 and 63.

The enantiomers of the racemic imides can be separated in two ways, either by direct resolution by means of an optically active acid such as tartaric acid, dibenzoyltartaric acid, camphorsulphonic acid etc., or by first resolving the succinic acid, which is then coupled with the appropriate amine. The latter method is illustrated for the preparation of the antipodes of the compound, the racemic modification of which is described in Example 2.

EXAMPLE 66

Resolution of 1-carboxy-1-[1,2,3,4-tetrahydronaphthyl] acetic acid (A) To a hot solution of 207.1 g. of the acid in 2200 ml. of 90% alcohol were added 260.5 g. of cinchonidine. The solution was filtered and then 1750 ml. of water were added. The solution was left to cool down to room temperature and then placed in a refrigerator for twenty-four hours. 385 g. of salt were obtained which was recrystallized twice from 90% alcohol (4 resp. 2 l.). The acid was liberated from the remaining salt (142.5 g.) and recrystallized from water-formic acid, yielding 56.5 g.

$$[\alpha]_D^{20} = +103°.$$

(B) The mother liquors from the first two crystallizations were combined and the acid liberated, yielding 123 g. This was dissolved in boiling 90% alcohol and treated with strychnine from 208.7 g. of nitrate. The salt obtained, which was very slightly soluble, was recrystallized twice from the same solvent (final volumes of 3 resp. 2.0 l.) yielding 172.5 g. The acid was liberated from the salt and recrystallized from water-formic acid yielding 61.5 g., $[\alpha]_D^{20} = -103°.$

EXAMPLE 67

Enantiomers of N-($\gamma$-diethylaminopropyl)-STS

Equimolecular amounts of (+)- or (−)-1-carboxy-1-[1,2,3,4 - tetrahydronaphthyl] - acetic acid and $\gamma$-diethylaminopropylamine were heated together at 180° C. for 2 hours. The reaction mixture was worked up as described in Example 2. The hydrochloride was recrystallized twice from ethyl acetatemethanol, yield about 60%, M.P. 172–4° C., $[\alpha]_D^{20} = \pm 2.55°.$

EXAMPLE 68

The local anaesthetic activity of the enantiomers of N-($\gamma$-diethylamino-propyl)-STS The activity was examined by the methods given in Example 65.

TABLE 7

| Compound | Rabbit cornea | Isolated frog sciatic nerve block | Toxicity i.v., $LD_{50}$ mg./kg. white mouse |
|---|---|---|---|
| (+) | 7 | 1 | 13 |
| (−) | 1.6 | 0.4 | 28 |

EXAMPLE 69

Injectible solution containing N-($\gamma$-diethylaminopropyl)-STS

To 100 ml. of hot, sterilized water 0.1 g. of methyl p-hydroxybenzoate were added while stirring and heating. After all of the benzoate was dissolved 2 g. of N-($\gamma$-diethylaminopropyl)-STS hydrochloride and 0.6 g. of sodium chloride were added while stirring. The pH adjusted to 7 by adding sodium hydroxide. Sterilized water was added to 100 ml.

EXAMPLE 70

Injectible solution containing N-($\gamma$-diethylaminopropyl)-STS and vasoconstrictor To 100 ml. of hot, sterilized water 0.1 g. of methyl p-hydroxybenzoate, 2 g. of N-($\gamma$-diethylaminopropyl)-STS hydrochloride and 0.6 g. of sodium chloride were added in the same manner as described in Example 69, but the solution was protected from atmospheric oxygen by working in a nitrogen atmosphere. 0.05 g. of sodium pyrosulfite were then dissolved, whereafter 1 mg. of adrenaline was added. The pH was adjusted to 4 by adding sodium hydroxide. Sterilized water was added to 100 ml.

EXAMPLE 71

Pharmaceutical jelly containing N-($\gamma$-diethylaminopropyl)-STS

To 80 ml. of distilled water 0.5 g. of N-($\gamma$-diethylaminopropyl)-STS hydrochloride was added. To this solution 4 g. of methylcellulose were added while stirring, and when all methylcellulose was dissolved a solution of 50 mg. of chlorhexidine diglyconate in 10 ml. of water was added and the volume was adjusted to 100 ml. by addition of distilled water.

EXAMPLE 72

Pharmaceutical ointment containing N-(γ-diethylaminopropyl)-STS

Equal amounts (27 g. of each) of polyethyleneglycol 300 and polyethyleneglycol 1540 were melted together with 19 g. of polyethyleneglycol 3000 at 60° C. Then 25 g. of propyleneglycol and finally 2 g. of N-(γ-diethylaminopropyl)-STS were added and the ointment was homogenized.

EXAMPLE 73

N-(γ-diethylaminopropyl)-7-fluoro-STS

See above on page 20.

In the specification and the claims the expression "lower alkyl and lower alkoxy groups" refer to groups containing not more than four carbon atoms.

I claim:

1. A compound of the formula:

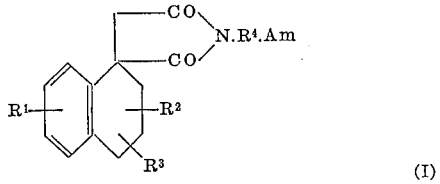

(I)

and their pharmaceutically acceptable acid addition salts, wherein $R^1$ is selected from the group consisting of hydrogen, halogen, hydroxy and the lower alkyl and alkoxy radicals containing not more than four carbon atoms; $R^2$ and $R^3$ are selected from the group consisting of hydrogen, hydroxy and the lower alkyl and alkoxy radicals containing not more than four carbon atoms; $R^4$ is bivalent, saturated alkylene radical containing at most 6 carbon atoms; Am is an amino group selected from the class consisting of pyrrolidino, piperidino, morpholino and

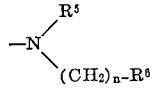

wherein $R^5$ is selected from the class consisting of a hydrogen atom and a lower alkyl group containing not more than four carbon atoms; $R^6$ is selected from the group consisting of a hydrogen atom, a hydroxy and a lower alkoxy group consisting of not more than four carbon atoms; and $n$ is 1–4 in cases where $R^6$ is a hydrogen atom and is 2–4 in cases where $R^6$ is from the class consisting of a hydroxy and lower alkoxy group containing not more than four carbon atoms.

2. A compound according to claim 1 and their pharmaceutically acceptable acid addition salts, wherein $R^1$, $R^2$ and $R^3$ are hydrogen.

3. A compound according to claim 1 and their pharmaceutically acceptable acid addition salts, wherein $R^1$ is a methoxy group.

4. N - (β - methylhydroxyethylaminoethyl)-spiro-tetralinesuccinimide and its pharmaceutically acceptable acid addition salts.

5. N - (δ - methylhydroxyethylaminobutyl)-spiro-tetralinesuccinimide and its pharmeutically acceptable acid addition salts.

6. N - (γ - diethylaminopropyl)-7-hydroxy-spiro-tetralinesuccinimide and its pharmaceutically acceptable acid addition salts.

7. N - (δ - diethylaminobutyl) - 7-methoxy-spiro-tetralinesuccinimide and its pharmaceutically acceptable acid addition salts.

8. N - (γ - dimethylaminopropyl - 6-methoxy-spiro-tetralinesuccinimide and its pharmaceutically acceptable acid addition salts.

9. N - (γ - diethylaminopropyl)-6-methoxy-spiro-tetralinesuccinimide and its pharmaceutically acceptable acid addition salts.

10. N - (γ - diethylaminopropyl)-spiro-tetraline succinimide and its pharmaceutically acceptable acid addition salts.

11. N - (β - methyl-β-diethylaminoethyl)-spiro-tetraline succinimide and its pharmaceutically acceptable acid addition salts.

12. N - (δ - diethylaminobutyl)-spiro-tetraline succinimide and its pharmaceutically acceptable salts.

References Cited

UNITED STATES PATENTS

| | | | |
|---|---|---|---|
| 3,210,374 | 10/1965 | Huebner | 260—326.5 |
| 3,224,936 | 12/1965 | Prill et al. | 260—326.5 XR |
| 3,256,277 | 6/1966 | Rice | 260—247.1 |
| 3,257,398 | 6/1966 | Grogan et al. | 260—247.5 |

ALEX MAZEL, Primary Examiner

J. A. NARCAVAGE, Assistant Examiner

U.S. Cl. X.R.

260—247.2, 294, 326.3, 465, 515; 424—248, 267, 274

PO-1050
(5/69)

UNITED STATES PATENT OFFICE
CERTIFICATE OF CORRECTION

Patent No. 3,507,881    Dated  April 21, 1970

Inventor(s)   Rune Verner Sandberg

It is certified that error appears in the above-identified patent and that said Letters Patent are hereby corrected as shown below:

Col. 4, Table 1, last line, 6th column, "73.75" should be -- 73.57 --;
Col. 5, Table 2, last line, 6th column, "7 28" should be -- 70.28 --;
Col. 5, Table 3, 5th line of column 7, "6092" should be -- 6.92 --;
Col. 13, line 1, "hydorchloride" should be -- hydrochloride --;
Col. 13, line 58, "63" should be -- 62 --;
Col. 14, line 48, after "pH" insert -- was --;
Col. 16, line 34, after "acceptable" insert -- acid addition --.

Column 8, line 13, "N-($\gamma$-diethylaminobutyl)-7-methoxy-STS" should read -- N-($\delta$-diethylaminobutyl)-7-methoxy-STS --.

SIGNED AND
SEALED
JAN 5 1971

(SEAL)
Attest:

Edward M. Fletcher, Jr.
Attesting Officer

WILLIAM E. SCHUYLER, JR.
Commissioner of Patents